UNITED STATES PATENT OFFICE.

BENJAMIN APPEL AND SAMUEL S. GOLDMAN, OF ST. LOUIS, MISSOURI.

FUEL COMPOSITION.

1,019,746. Specification of Letters Patent. Patented Mar. 12, 1912.

No Drawing. Application filed May 31, 1911. Serial No. 630,463.

*To all whom it may concern:*

Be it known that we, BENJAMIN APPEL and SAMUEL S. GOLDMAN, citizens of the United States, residing at the city of St. Louis, State of Missouri, have jointly invented a certain new and useful Fuel Composition, of which the following is a specification.

This invention relates to a certain new and useful fuel composition.

We have discovered, briefly stated, that the vapors or gases obtained by vaporizing crude oil or other hydro-carbon and our new fuel composition, which forms the subject-matter of this application, when properly combined, mixed or intermingled together and with air and ignited, will produce an intensely hot and practically odorless and smokeless flame.

In an application filed by us in the United States Patent Office on August 11, 1910, and serially numbered 536,739, we have shown and described a certain vapor-burner which is especially adapted for use in connection with, or for carrying into practical and successful operation, our said process or discovery above stated. This burner, as in said application fully described, comprises a mixing chamber and a plurality of independent fuel conducting and vaporization pipes—one for the said crude oil or other hydro-carbon and one for our new fuel composition. The said crude oil or other hydro-carbon and our new fuel composition are vaporized in their respective pipes, the vapors or gases therefrom being led or conducted by said pipes to said mixing chamber, in which chamber the said vapors or gases are combined, mixed, or intermingled together and with air, and we have found that the resulting vapor or gas will, when ignited, as before stated, burn in an intensely hot, vitalized flame.

Our said fuel composition consists substantially of water, alcohol, camphor, and rosin, in the proportions approximately of one quarter pint of alcohol, one ounce of camphor, and one ounce of rosin to a gallon of water. The said camphor and rosin are first in solid form, being, however, preferably ground or granulated, but when placed in the alcohol and water, which are preferably first mixed together, will be dissolved, the several ingredients being then thoroughly mixed and intermingled. We have found that the vapor or gas from or of this composition will readily unite with air and with the vapor or gas from or of crude oil, the resulting vapor or gas burning, when ignited, as we have before stated, in an intensely hot, vitalized, and practically odorless and smokeless flame.

While we have been particular to specify herein approximately the exact proportions of the several ingredients entering into our new fuel composition, yet it is to be understood that said proportions may be varied as required under varying conditions without departing from the nature of our invention.

Having thus described our invention, what we claim and desire to secure by Letters Patent is:

1. The composition of matter herein described, the same comprising water, alcohol, camphor, and rosin; substantially as described.

2. The composition of matter herein described, the same comprising water, alcohol, camphor, and rosin in the proportions approximately of one quarter pint of alcohol, one ounce of camphor, and one ounce of rosin to a gallon of water; substantially as described.

In testimony whereof, we have signed our names to this specification, in the presence of two subscribing witnesses.

BENJAMIN APPEL.
SAMUEL S. GOLDMAN.

Witnesses:
CHARLES J. MALECEK,
MAX FENDLER.